UNITED STATES PATENT OFFICE.

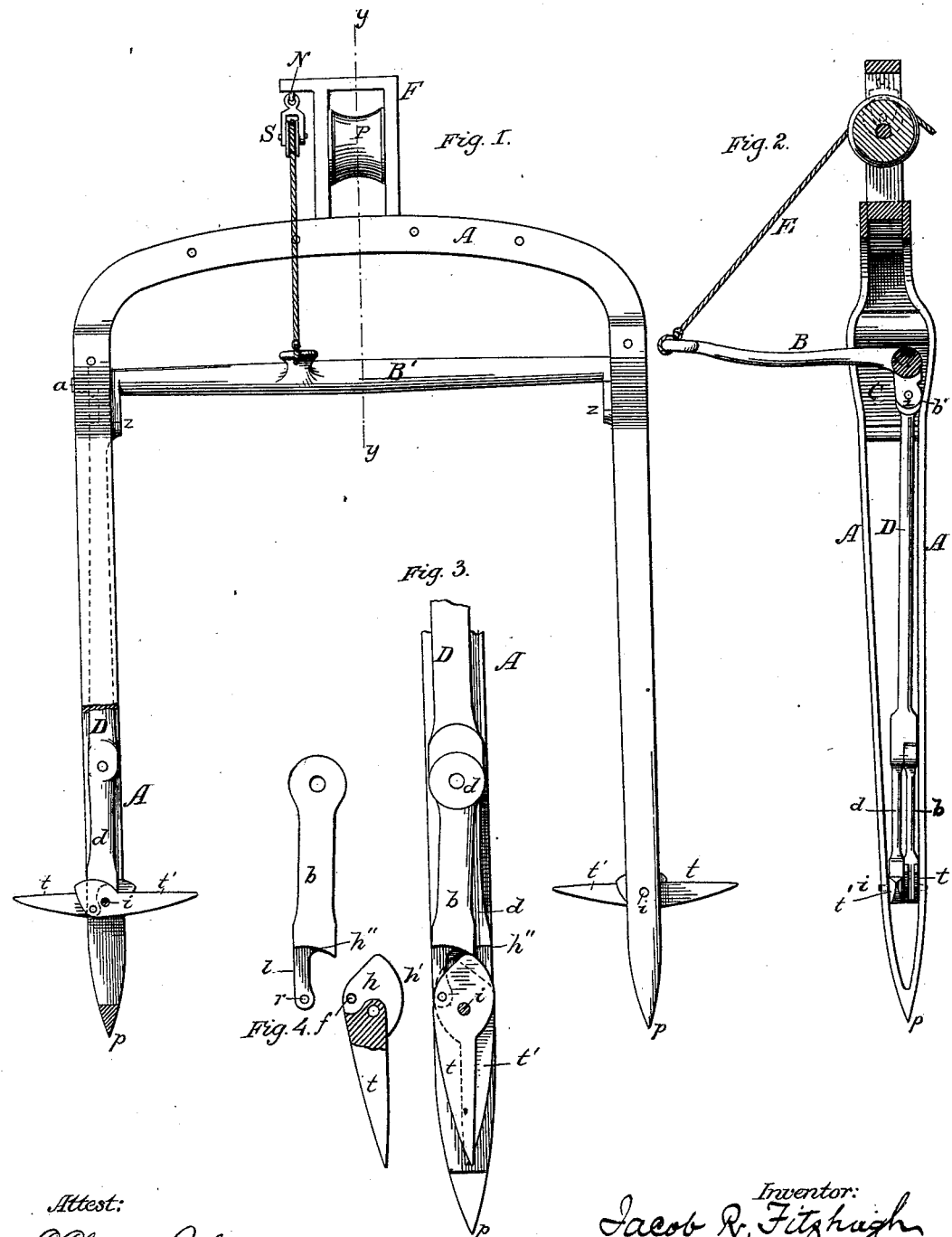

JACOB R. FITZHUGH, OF PHILADELPHIA, PENNSYLVANIA.

IMPROVEMENT IN HORSE HAY-FORKS.

Specification forming part of Letters Patent No. 213,645, dated March 25, 1879; application filed February 20, 1879.

*To all whom it may concern:*

Be it known that I, JACOB R. FITZHUGH, of the city of Philadelphia, in the State of Pennsylvania, have invented a new and Improved Hay-Fork; and I hereby declare the following to be a full, clear, and exact description thereof, reference being had to the accompanying drawings, making part of this specification, in which—

Figure 1 is an elevation, showing the short tines projecting. Fig. 2 is a vertical section on the line $y\ y$ of Fig. 1. Fig. 3 shows details to be referred to.

My invention relates to that class of horse hay-forks having heavy tines, which pass through the body of the hay, and short tines, which are movable, so as to hold the hay on the long tines; and my invention has for its object to provide a light, cheap, strong, and effective fork.

My invention consists, first, in a casing or frame forming two tines, in which operate vertical rods, actuated by a rock-shaft, bearing at its ends cam-levers to operate the short tines, and provided with a lever, to which is attached the tripping-rope; secondly, in so constructing the cams on the end of the rock-shaft, and the heads of the rods which actuate the short tines, that when the cams are thrown beyond the dead-point the heads of the rods rest against the frame or main tines, and relieve the pivots of heavy strain; thirdly, in constructing the joint between the thrust-rods and short tines somewhat after the manner of a rule-joint, so that the strain on the pivots is in a great measure relieved, and the hay is prevented from entering the joints.

In order that those skilled in the art may make and use my invention, I will proceed to describe the manner in which I have carried it out.

In the said drawings, A A are two strips of steel, curved and brought together at their ends, and welded so as to form sharp points $p$ for assisting the fork through the hay. Between A A, a short distance above the points $p$, are pivoted two short tines, $t\ t'$, on a pin, $i$. These tines are divided at their heads, so as to form two cam-shaped head-plates, $h\ h$, the curve being at $h'$, and the cam-plates are perforated at $f$ to receive a pin to journal them to a leg, $l$, on the thrust-rod D, through the perforation $r$. At the juncture of the legs $l$ with the link $b$ and thrust-rod D the link and rod are provided with an offset having a curved face, $h''$, the curvature of which corresponds with the curvature of the cam-plates $h$, as seen at $h'$, and the edges of the plates $h$ bear against the curved shoulders $h''$, thereby relieving the pins in holes $r$ and $f$ from any considerable strain when the thrust comes on tines $t\ t'$ to throw them out into the hay.

The curves of heads $h$ and the curves of the offsets $h''$ lie in opposite directions across the main tines A A, as shown, so that when the downward thrust is made on the cam-shaped heads the tines $t\ t'$, turning on pin $i$, fly out in opposite directions.

The operating mechanism of the short tines consists of a link, $b$, bearing one short tine and pivoted to the rod D at $d$, and the thrust-rod D, all housed between the plates A A, forming the main tines. The rods D, at their upper ends, are journaled in the ends of eccentric cams $z$ on each end of a rock-shaft, B', the cams $z$ also lying between the plates A A, to protect them from the hay and straw.

The rock-shaft B' is turned by means of a lever, B, to which is attached a tripping-cord, E. When lever B is forced down to about a right angle with tines A A, the cam-lever $z$ forces down rod D, and with it link $b$, and the tines $t\ t'$ are forced outward. The cam-levers $z$ then pass the dead-point and lie with their heads against plate A at $b'$, leaving the tines $t\ t'$ locked in their projecting position. When the tines are thus locked outwardly, the head of rod D is crowded against plate A at $b'$, which relieves the pivot at that point of much of the strain.

The construction is such that when the tines $t\ t'$ are folded in, as seen in Fig. 3, their points are only a very short distance from the point $p$ of the main tines A A; and when they are projected outward, they force the main tines farther into the hay or straw by means of the pressure on their upper surfaces, thus being able to take up more short hay and straw and gather cleaner. On the center of the bend of the main tines is a housing, F, for the hoisting-pulley P, and on this housing I cast a projection, N, in which I swivel the guiding-pulley S of the tripping-cord E.

The operation of the fork is as follows: Lever B being up, and the tines $t\ t'$ in the position seen in Fig. 3, the tines A A are thrust as far down into the mass of hay or straw as can be. Lever B is then brought down, and tines $t\ t'$ are forced outward and upward, catching the hay from a point close down to the point of the tines A A', and when cam-levers $z$ pass beyond the dead-point the tines $t\ t'$ are locked. The fork is then hoisted by proper tackle, and conveys the hay with it to any point where it is to be discharged. Pulling-cord E throws the cam $z$ beyond the point of support of rod D. The tines $t\ t'$ are unsupported. They drop, and the hay falls from tines A A.

Having thus described my invention, what I claim as new, and desire to secure by Letters Patent, is—

1. The steel plates A A, welded at their ends to form the main tines and a housing for the operating mechanism, in combination with the cam-lever $z$, thrust-rods D, links $b$, and short tines $t\ t'$, substantially as described.

2. The plates A A, thrust-rod D, and cam-lever $z$, arranged and constructed as described, so that when the cam-lever passes the dead-point it crowds the head of rod D against A at $b'$, as set forth.

3. In a hay-fork, the thrust devices D $b$, constructed with legs $l$ at their lower ends and with curved offsets $h''$, in combination with the tines $t\ t'$, constructed with cam-plate heads $h\ h$, as and for the purpose set forth.

JACOB R. FITZHUGH.

Witnesses:
R. K. EVANS,
L. F. WILDERMUTH.